(12) United States Patent
Weitz et al.

(10) Patent No.: US 11,447,206 B2
(45) Date of Patent: Sep. 20, 2022

(54) ZERO TURN VEHICLE

(71) Applicants: Dylan Weitz, Berkeley Heights, NJ (US); Ashraf Elghandour, Lafayette, NJ (US); Gabriel Elghandour, Lafayette, NJ (US)

(72) Inventors: Dylan Weitz, Berkeley Heights, NJ (US); Ashraf Elghandour, Lafayette, NJ (US); Gabriel Elghandour, Lafayette, NJ (US)

(*) Notice: Subject to any disclaimer, the term of this patent is extended or adjusted under 35 U.S.C. 154(b) by 227 days.

(21) Appl. No.: 16/930,891

(22) Filed: Jul. 16, 2020

(65) Prior Publication Data

US 2021/0024170 A1 Jan. 28, 2021

Related U.S. Application Data

(60) Provisional application No. 62/878,435, filed on Jul. 25, 2019.

(51) Int. Cl.
| | | |
|---|---|---|
| *B62M 1/12* | (2006.01) | |
| *B62K 5/02* | (2013.01) | |
| *B62K 3/00* | (2006.01) | |
| *B62M 1/24* | (2013.01) | |
| *B62J 25/02* | (2020.01) | |
| *B62M 1/20* | (2006.01) | |
| *B62J 25/00* | (2020.01) | |

(52) U.S. Cl.
CPC .............. *B62M 1/12* (2013.01); *B62K 3/005* (2013.01); *B62K 5/02* (2013.01); *B62J 25/00* (2013.01); *B62J 25/02* (2020.02); *B62M 1/20* (2013.01); *B62M 1/24* (2013.01)

(58) Field of Classification Search
CPC . B62M 1/12; B62M 1/24; B62M 1/20; B62K 3/005; B62K 5/02; B62J 25/02; B62J 25/00
See application file for complete search history.

(56) References Cited

U.S. PATENT DOCUMENTS

| | | | |
|---|---|---|---|
| 5,178,593 A * | 1/1993 | Roberts | A63B 22/0007 482/56 |
| 5,527,246 A * | 6/1996 | Rodgers, Jr. | B62M 1/26 482/52 |
| 6,514,180 B1 * | 2/2003 | Rawls | A63B 21/005 482/70 |
| 7,530,932 B2 * | 5/2009 | Lofgren | A63B 22/0002 482/62 |

(Continued)

*Primary Examiner* — Kevin Hurley
*Assistant Examiner* — Marlon A Arce
(74) *Attorney, Agent, or Firm* — Heslin Rothenberg Farley and Mesiti PC; Nicholas Mesiti

(57) ABSTRACT

A vehicle propellable by a human comprising a front assembly having a front wheel and a pair of hand pedals connect thereto; a rear assembly having a first rear wheel and a second rear wheel rotatably connected thereto; a chest rest located between the front assembly and the rear assembly, the chest rest configured to support the chest of a rider lying forward on the vehicle; and a first foot support structure operatively coupled to rotate the first rear wheel, and a second foot support operatively coupled to rotate the second rear wheel wherein the first rear wheel and second rear wheel are independently rotated by opposite feet of a rider when said feet are within said first and second foot support, respectively.

18 Claims, 16 Drawing Sheets

(56) References Cited

U.S. PATENT DOCUMENTS

| | | | |
|---|---|---|---|
| 10,276,056 B2* | 4/2019 | Rasmussen | G09B 9/006 |
| 2008/0129008 A1* | 6/2008 | Tarasov | B62M 1/12 |
| | | | 280/220 |
| 2017/0368409 A1* | 12/2017 | Felker | B62M 3/14 |
| 2018/0066741 A1* | 3/2018 | Luo | F03G 5/06 |
| 2018/0086360 A1* | 3/2018 | Pierce | B62B 17/062 |
| 2020/0376327 A1* | 12/2020 | Bissonnette | A63B 23/03575 |
| 2021/0024170 A1* | 1/2021 | Weitz | B62J 25/02 |

\* cited by examiner

Top

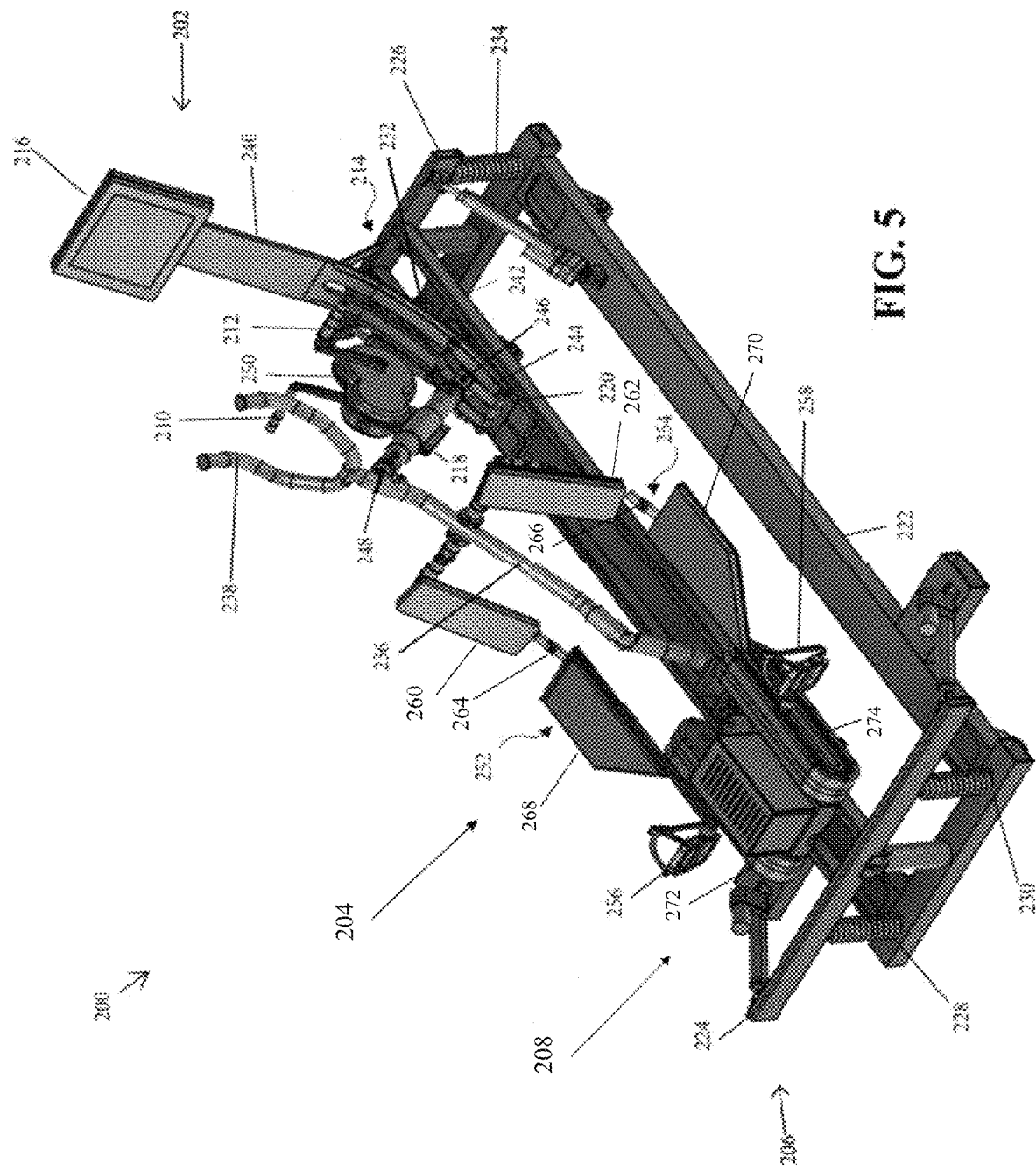

ZERO TURN VEHICLE

CROSS REFERENCE TO RELATED APPLICATION

This application claims priority to U.S. Provisional Application Ser. No. 62/878,435, filed on Jul. 25, 2019 entitled "Zero Turn Vehicle", the entire disclosure of which is incorporated by reference.

FIELD OF THE INVENTION

The present invention relates generally to a zero turn human-powered or propelled vehicle similar to a bicycle. More specifically, but not exclusively, the present invention concerns a zero turn lay down vehicle.

BACKGROUND OF THE INVENTION

Bicycles are a prominent mode of human-powered transportation and are frequently used for exercise and recreational purposes. In conventional so-called upright bicycles, the seat is positioned between and above the wheels while the pedals are positioned below the seat. These conventional upright bicycles have several drawbacks, such as the potential to flip over the front handlebars upon sudden braking or to develop or exacerbate back issues due to stress placed on the lower back. Some bicycles, e.g. recumbent bicycles, provide a different seating arrangement to reduce stress on the lower back and prevent flipping over the front handlebars.

In a recumbent bicycle, the rider's legs extend forward and are substantially parallel to the ground. Thus, wind resistance is reduced relative to a conventional bicycle because the combined frontal area is less. Furthermore, recumbent bicycles have a lower center of gravity and more evenly distributes weight, which increases deceleration while reducing the chances of the rider being thrown forward and into or onto the handlebars. Despite these advantages, recumbent bicycles still face issues of maneuverability compared to conventional bicycles.

Zero turn vehicles are becoming more favorable in different industries due to their increased maneuverability, particularly in navigating complex paths and sharp turns. For example, zero turn lawn mowers are frequently used in the lawn care industry because they are faster and easier to maneuver. In addition, passenger vehicles utilize four-wheel independent steering to achieve zero turn radius. Where high maneuverability is desired, a vehicle capable of zero turn changes in direction is highly favorable.

SUMMARY OF THE INVENTION

In one aspect, the present disclosure provides a zero turn vehicle for greater maneuverability, greater safety, and less stress on the rider's back. The zero turn vehicle includes a frame, a leg assembly, a front assembly, and a rear assembly. The zero turn vehicle is similar to a bicycle but has two independent rear wheels.

The frame may include a fork on which the rider's chest will lay. The leg assembly may include a rotational connector, quad support, knee support, shin support, foot holder, and rotational track assembly. The foot holder may be connected to the rotational track via pin, which is connected to a wheel in the center of the rotational track and moves with the foot holder both clockwise and counterclockwise around the track housing. This movement and rotational force actuate the gears connected to the wheel, such that rotating counterclockwise will slow the forward motion and bring the bicycle to a full stop. Together, the chest fork and leg assembly provide support for the rider. In this way, a user sits on the seat in a forward prone position and the pressure is more evenly distributed along the rider's legs and chest. Thus, stress on the rider's lower back, gluteus maximus, and groin area is reduced. The Frame will contract and expand as the rider pushes or pulls the front and back pedals in a simultaneously motion. The rider's motion will dictate the pressure and contact points he/she will have with the frame. The bicycle design is intended to approximately simulate the running gait of a four-legged animal.

The front assembly may include a front frame, differential gear box, derailleur, 11-speed cassette, hand pedals, spring connectors, and front wheel assembly. Turning the hand pedals in a clockwise rotation transfers torque through a chain-link to the differential gear box, which in turn redistributes the power to the back wheels. The front assembly will collapse and expand in response to the rotational push and pull of the front pedals. In combination with the push and pull of the back pedals, this will cause the rider's midsection to contract and expand in response.

The rear assembly may include a rear wheel frame, leg assembly, rear wheel damping assembly, and two wheels. Each wheel is housed between the rear wheel frame and the leg assembly and two wheels will provide an overall better center of gravity. Furthermore, each wheel is independently operated, thus allowing the rider to vary the torque between the two wheels and cause the bicycle to turn. The leg assembly may include a pair of leg support systems which may be comprised of a quad support, knee support, shin support, foot holder, and rotational track. The damping assembly allows the rear wheel frame to have some movement and pivot in response to the rider changing direction or on a bumpier track, similar to an independent suspension of a motor vehicle.

In one aspect, the vehicle includes a front assembly having a front wheel and a pair of hand pedals connect thereto; a rear assembly having a first rear wheel and a second rear wheel rotatably connected thereto; a chest rest located between the front assembly and the rear assembly, and a first foot support structure operatively coupled to rotate the first rear wheel, and a second foot support operatively coupled to rotate the second rear wheel wherein the first rear wheel and second rear wheel are independently rotated by opposite feet of a rider when said feet are within said first and second foot support, respectively.

The chest rest is configured to support the chest of a rider lying forward on the vehicle. The front assembly, rear assembly and chest rest are connected to form a frame of the vehicle wherein the rider grips the pair of hand pedals with hands and lays forward on the frame with feet within the foot supports. The vehicle frame flexes downward and forward when the rider rotates the hand pedal forward and/or one or more of the foot support structures is moved or pushed rearward by the rider's feet. The vehicle front assembly includes multiple sections connected by a spring assembly to allow the front assembly to flex. The rear assembly is rotatable relative to the front assembly to allow the frame to flex. The vehicle includes a differential gear assembly operatively connected to the pair of hand pedals, the differential gear assembly being coupled operatively to the first rear wheel and second rear wheel to rotate the same. The vehicle hand pedals are operatively connected to a multi speed cassette gear and derailleur to move a sprocket chain between sets of sprockets on the cassette to change speed of rotation of the hand pedals. A hand shifter is located proximate the hand pedals and is connected to the derailleur to facilitate shifting of gears. The first foot support is operatively connected to the first rear wheel by a rotational track. The rotational track has an oval shape and is operationally engaged to the first foot support to move the foot support around the track as the rider's foot pushes and pulls the foot support to rotate the first rear wheel. The second foot support is operatively connected to a second rear wheel by a rotational track. The rotational track has an oval shape and is operationally engaged to the second foot support to move the foot support around the track as the rider's foot pushes and pulls said foot support to rotate the second rear wheel.

In another aspect, provided herein is a lay down stationary bicycle for exercise. The stationary bicycle is substantially similar to the zero turn bicycle previously described. Key differences include replacement of the front assembly with an extension system and screen display, addition of a magnetic braking system, and addition of a stationary support platform.

These, and other objects, features and advantages of this invention will become apparent from the following detailed description of the various aspects of the invention taken in conjunction with the accompanying drawings.

BRIEF DESCRIPTION OF THE DRAWINGS

For the purposes of illustrating the zero turn bicycle, there is shown herein illustrative embodiments. These illustrative embodiments are in no way limiting in terms of the precise arrangement and operation of the disclosed walkers, list assist seats and related methods and other similar embodiments are envisioned within the spirit and scope of the present disclosure.

FIG. 4 (D) is an isometric view of the rear wheel damping assembly of the rear assembly in FIG. 4A-C of the present invention;

FIG. 5 is an isometric view of another embodiment of the lay down bicycle, in accordance with an aspect of the present invention.

DETAILED DESCRIPTION

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements. Any examples of parameters are not exclusive of other parameters of the disclosed embodiments. Components, aspects, features, configurations, arrangements, uses and the like described, illustrated or otherwise disclosed herein with respect to any particular embodiment may similarly be applied to any other embodiment disclosed herein.

Figure 1A:
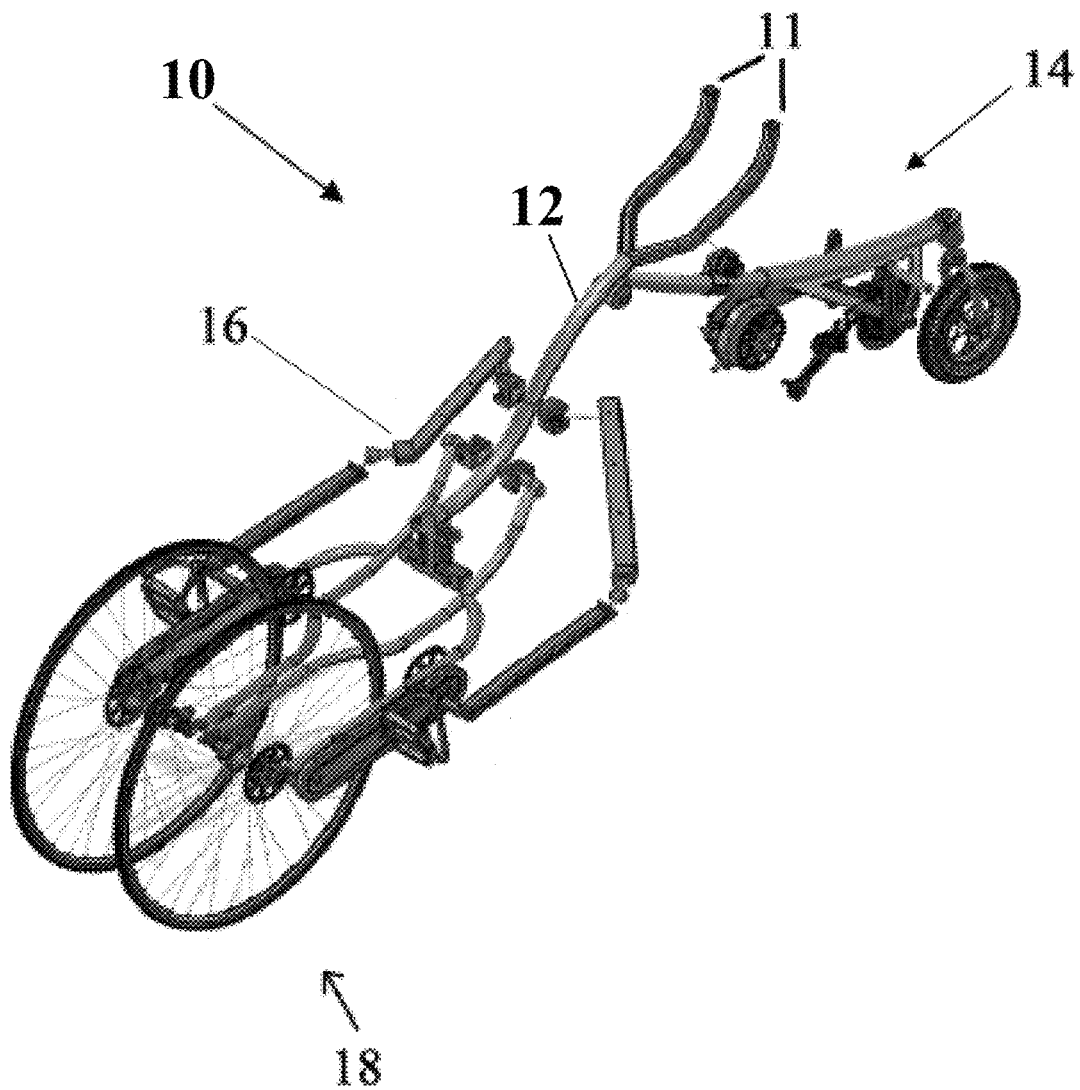
FIG. 1 (A) is an isometric view, (B) is a top view, and (C) is a side view of one embodiment of a zero turn lay down bicycle, in accordance with an aspect of the present invention.
Figure 1B:
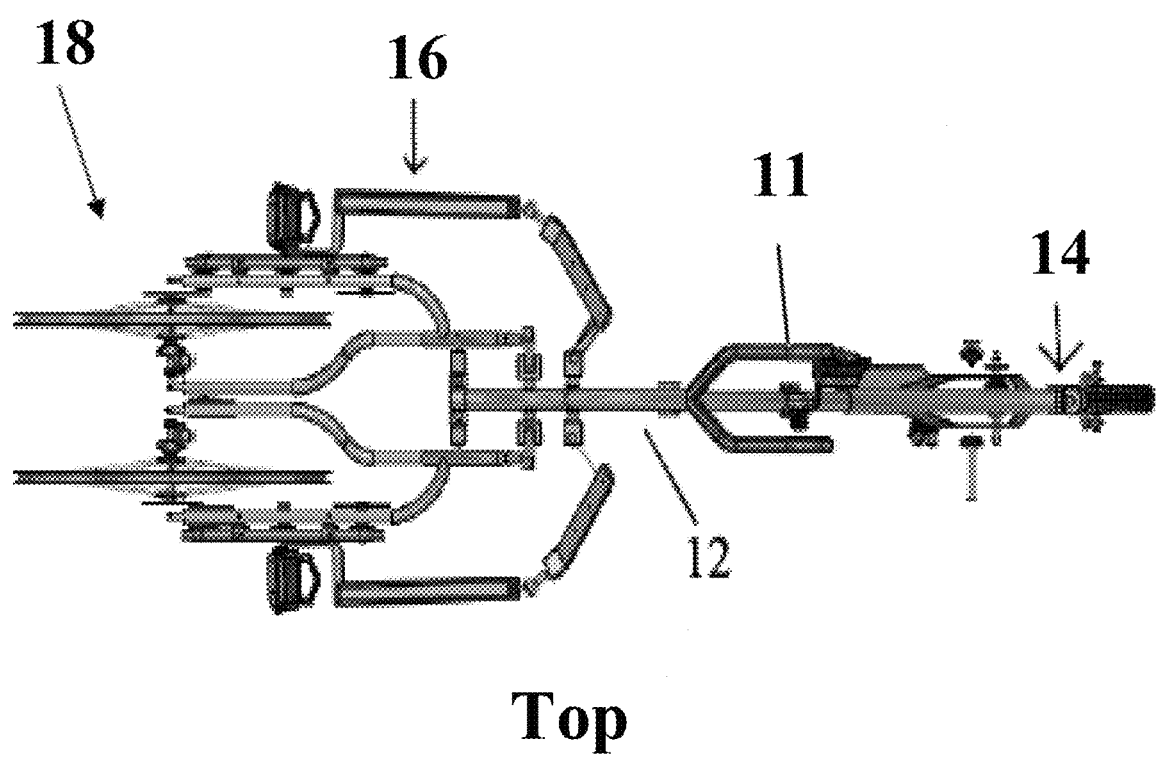
Figure 1C:
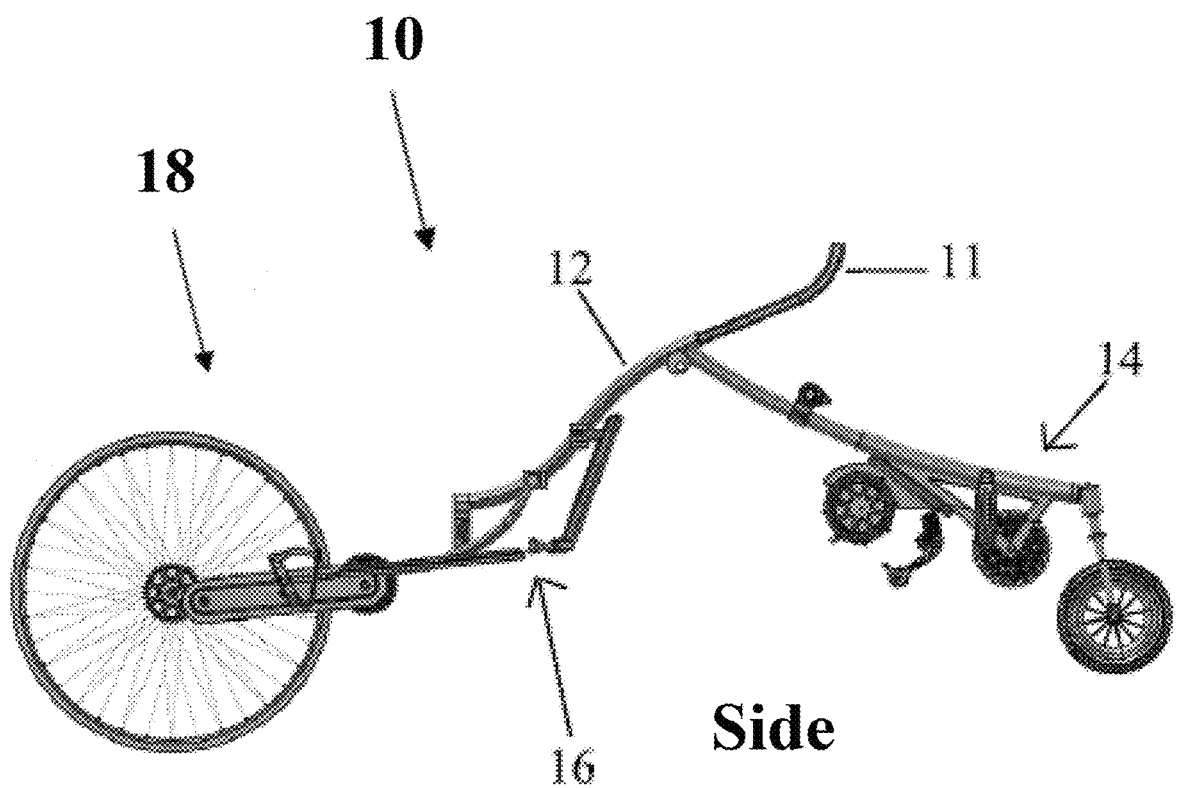
Figure 2A:
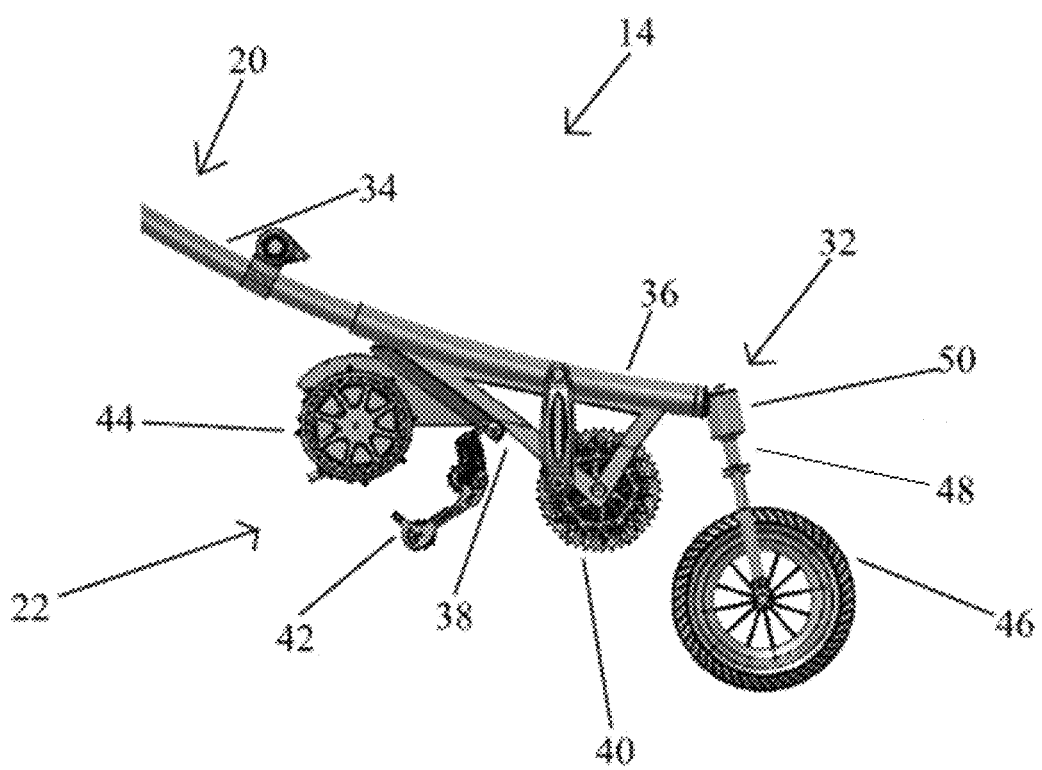
FIG. 2 (A and B) are side views, and (C and D) are isometric views of the front assembly of the present invention.
Figure 2B:
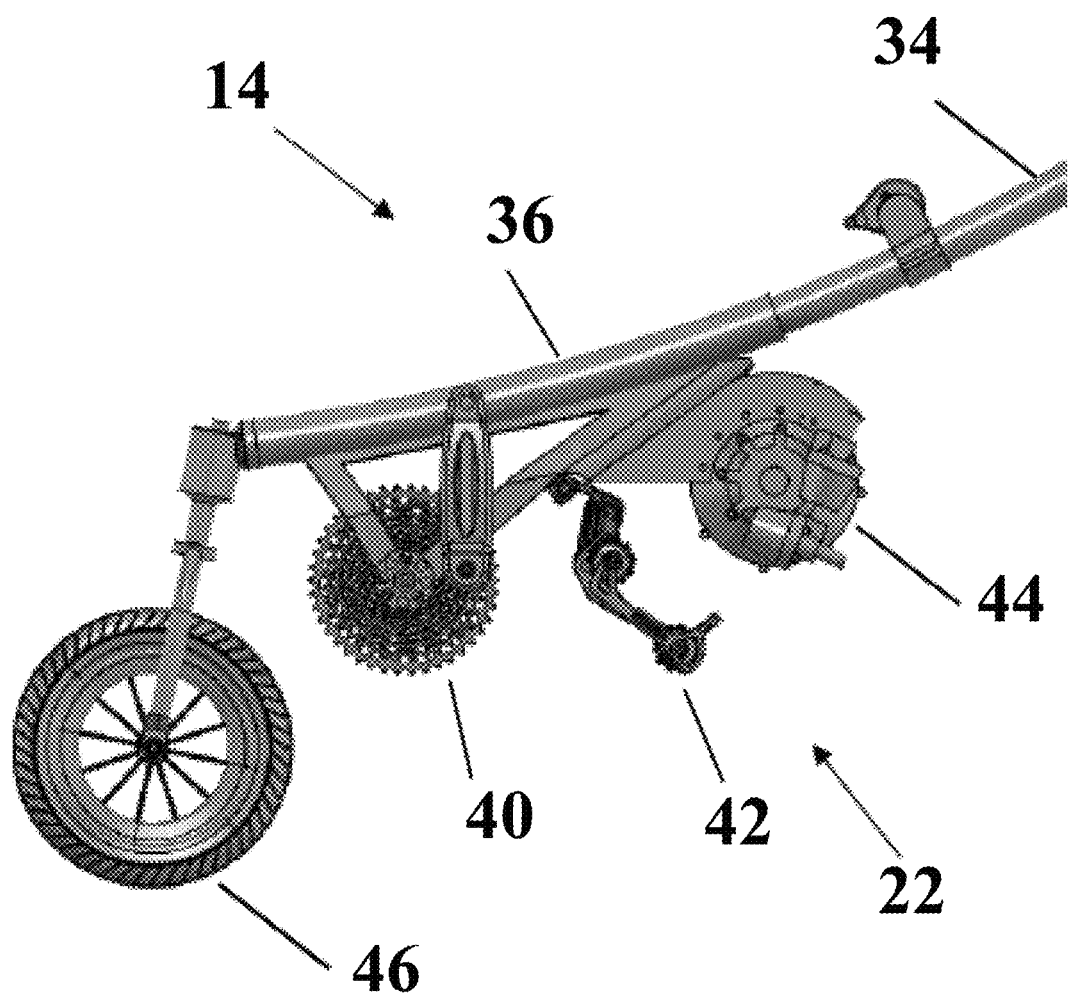
Figure 2C:
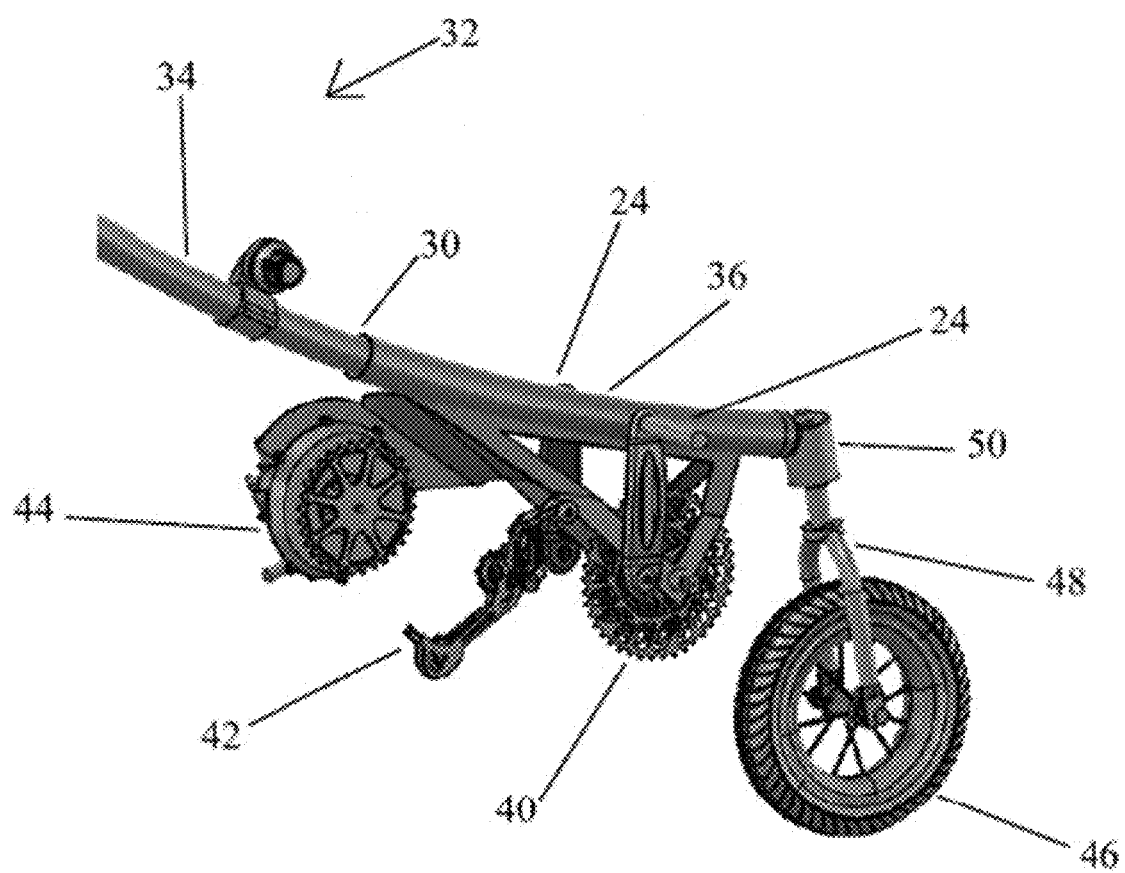
Figure 2D:
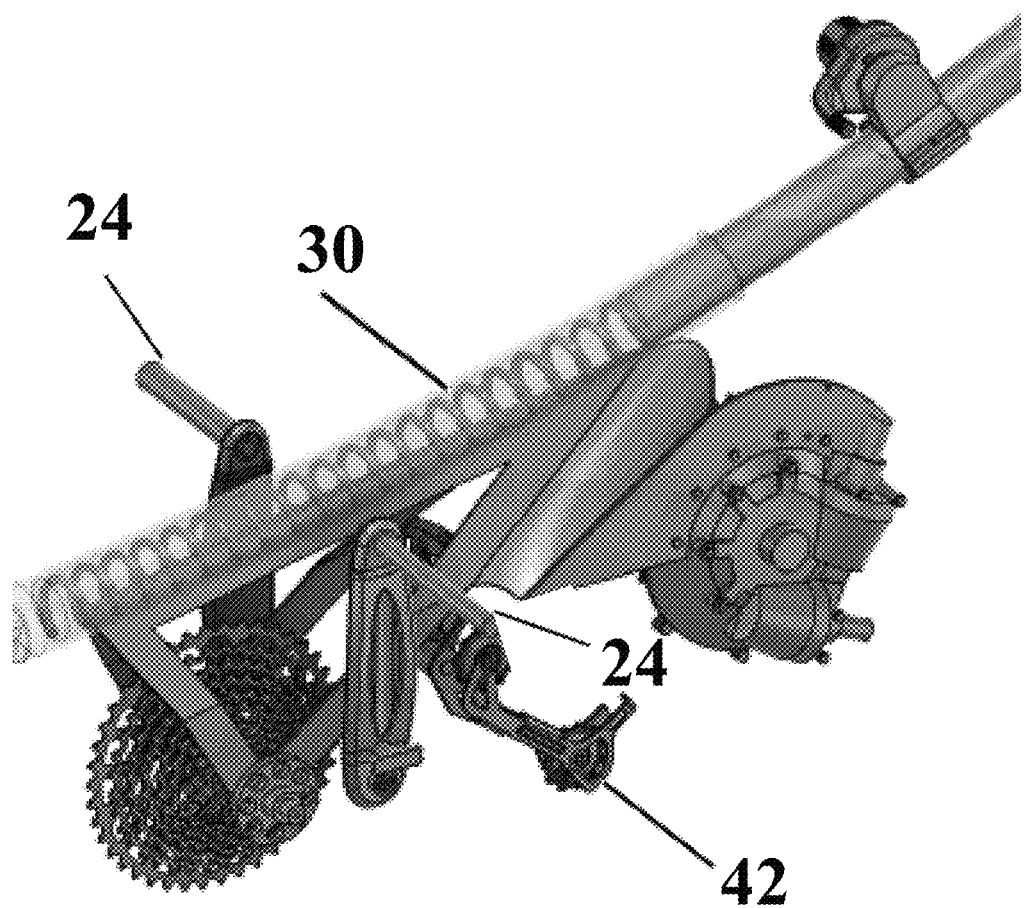
Figure 3A:
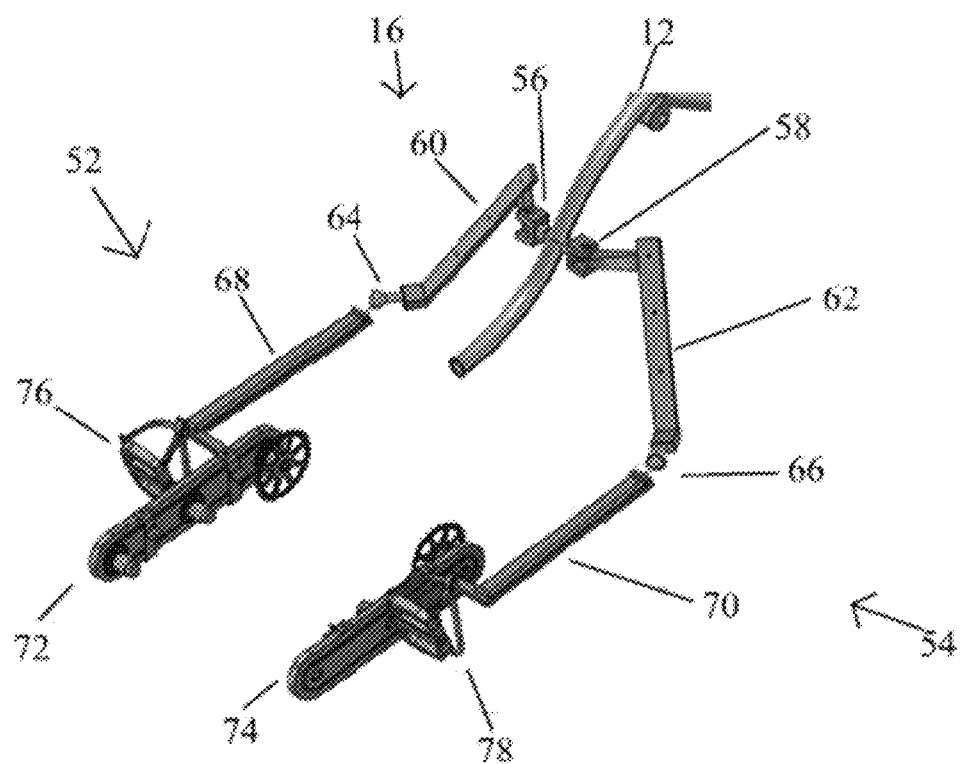
FIG. 3 (A and B) are isometric views, (C) is a top view, and (D) is an isometric view of the leg assembly and rotational track assembly of the present invention.
Figure 3B:
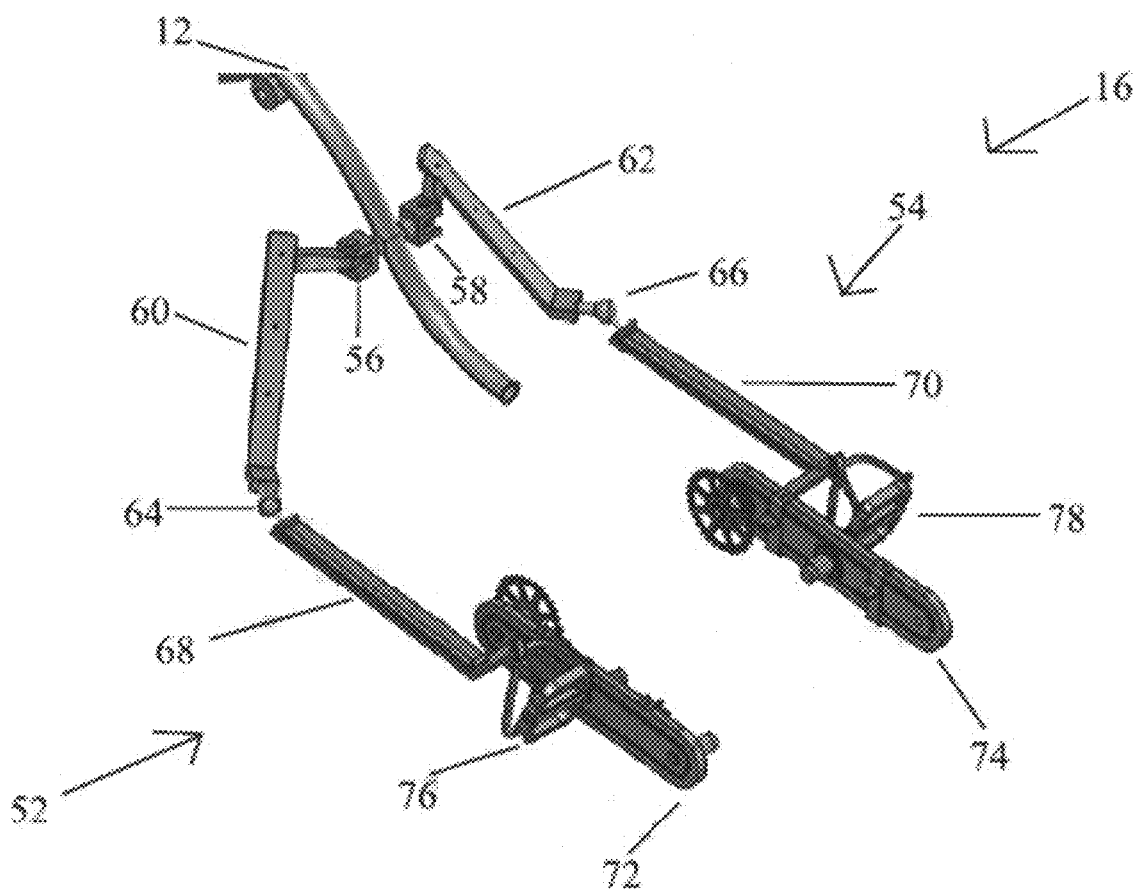
Figure 3C:
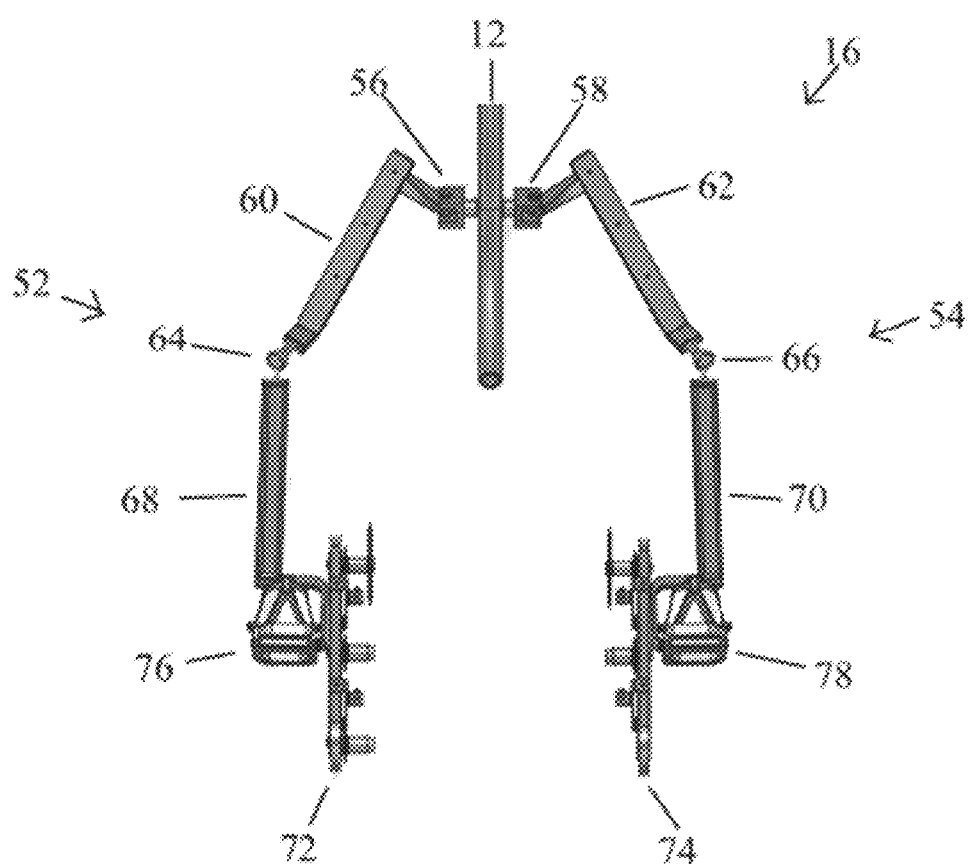
Figure 3D:
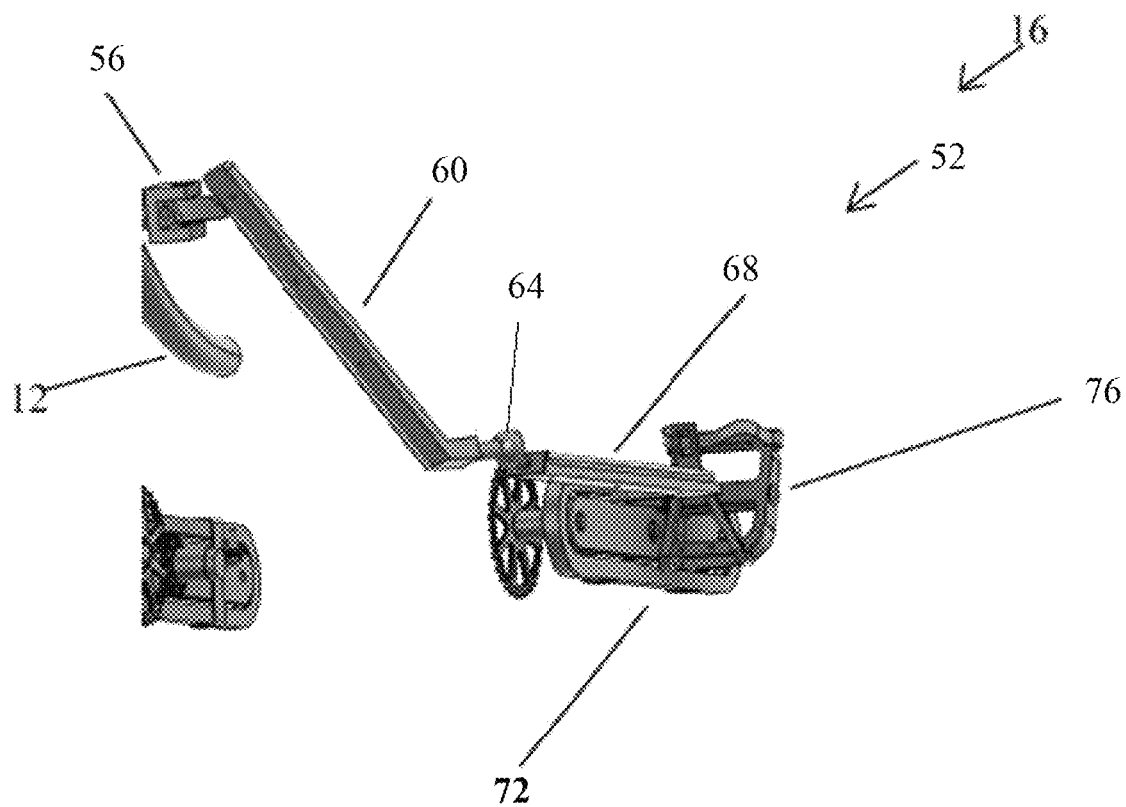
Figure 4A:
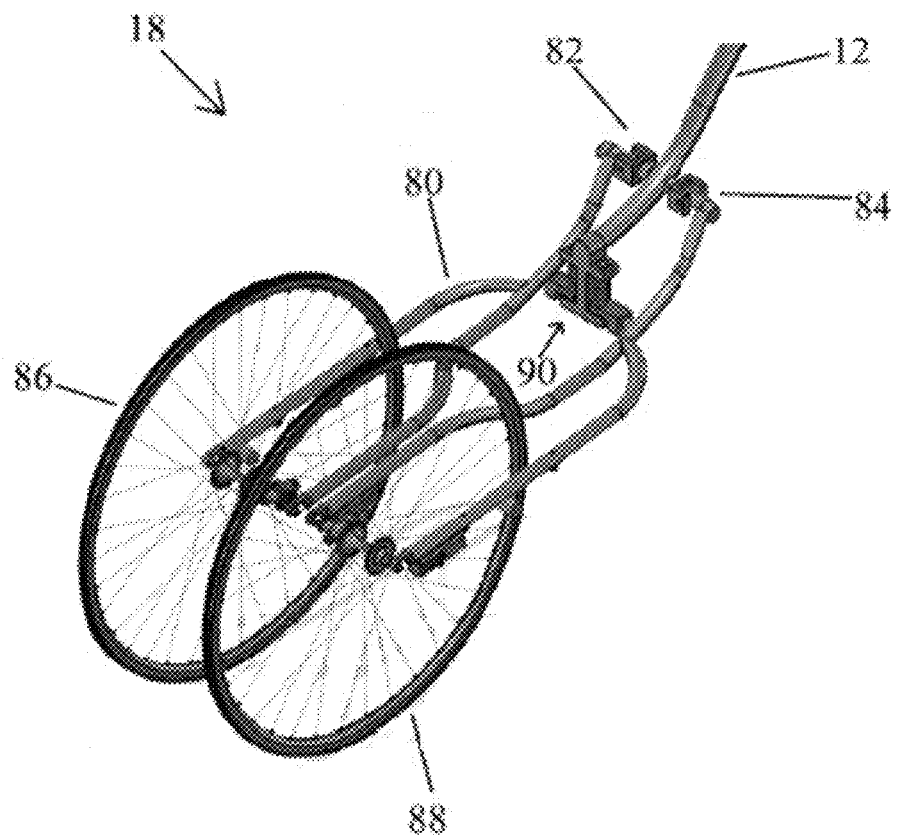
FIG. 4 (A) is an isometric view, (B) is a top view, and (C) is a side view of the rear assembly of the present invention.
Figure 4B:
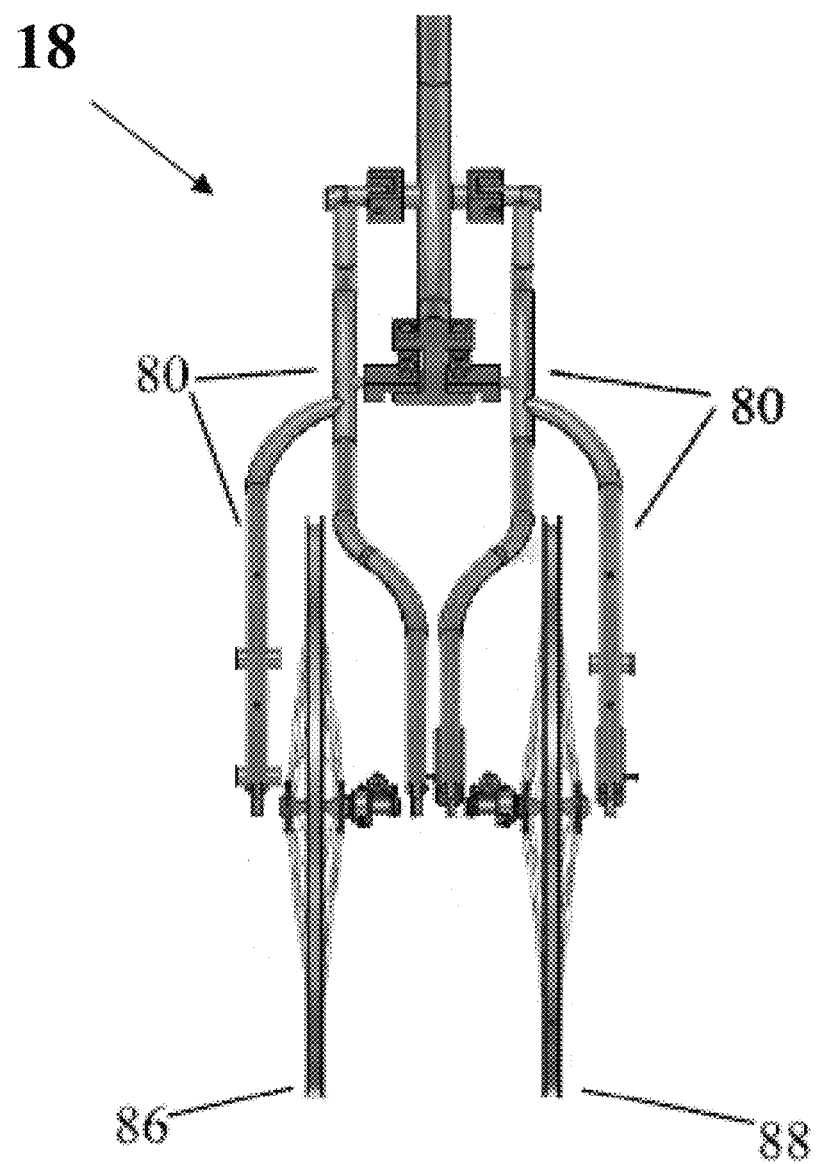
Figure 4C:
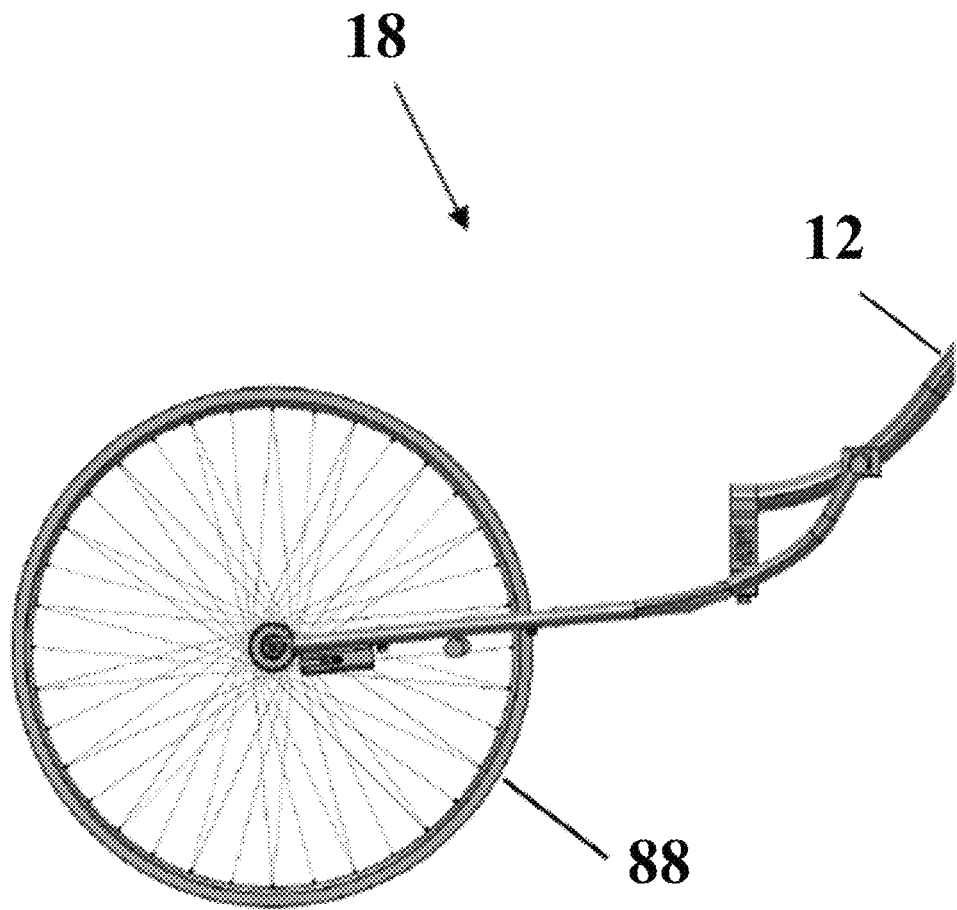
Figure 4D:
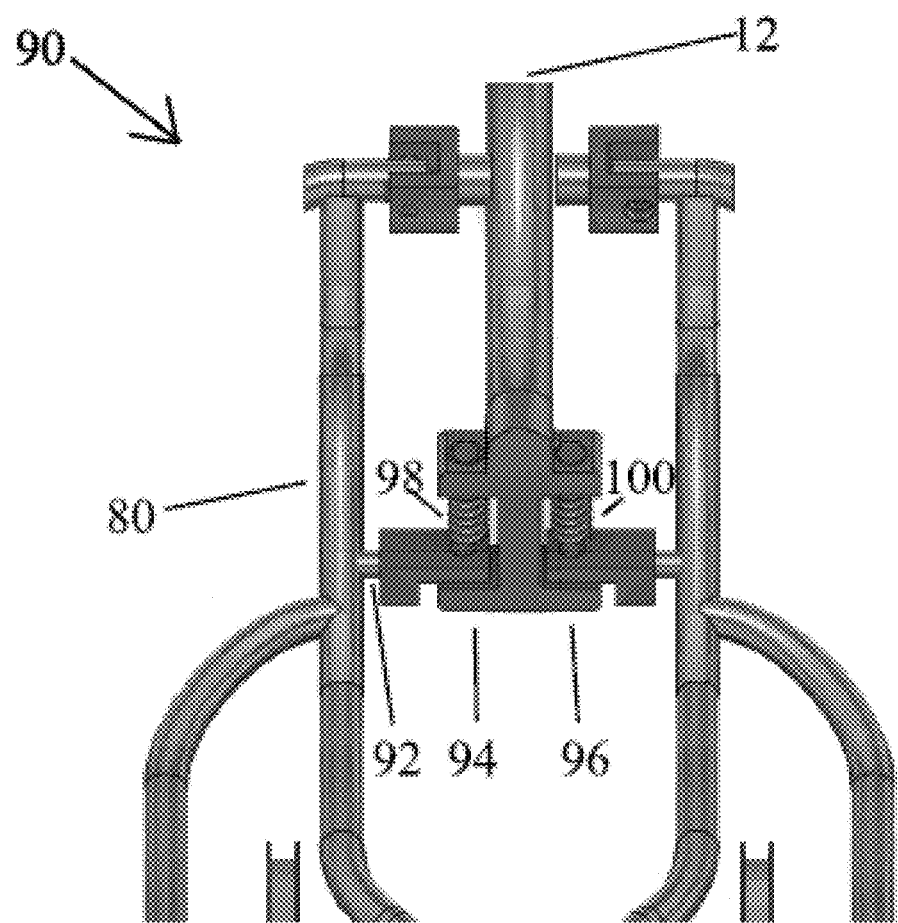

Referring to the drawings, wherein like reference numerals are used to indicate like or analogous components throughout the several views, and with particular reference to FIGS. 1A-C, there is illustrated an exemplary embodiment of a zero turn bicycle 10. Zero turn bicycle 10 comprises a bicycle frame 12, a front assembly 14, a leg assembly 16, and a rear assembly 18. Bicycle frame 12 forks at the front end to form a chest rest 11. A rider will lay with his/her chest on the fork end of the frame upon the chest rest 11. The top of the fork ends should reach the rider's shoulders. The rider's legs and weight will be further supported by leg saddles and the pedals. Normal bikes that are sat on usually lead to stress on the rider's lower back, gluteus maximus, and groin area. The pressure is more evenly distributed along the rider's legs and chest. The frame 12 will contract and expand as the rider pushes or pulls the front and back pedals in a simultaneously motion. The rider's motion will dictate the pressure and contact points he/she will have with the frame. The bike design is intended to approximately simulate the running gait of a four-legged animal.

FIGS. 2A-D illustrate front assembly 14. Front assembly 14 includes a front frame 20, a differential gear box assembly 22, a pair of hand pedals 24, 26, a pair of spring connectors 28, 30, and a front wheel assembly 32. Front assembly 14 is designed to collapse and expand in response to the rotational push and pull of hand pedals 24, 26. Front frame 20 is comprised of two hollow tubes 34, 36 that are held together by two spring connections 28, 30. Front frame 20 supports the front assembly and is coupled to bicycle frame 12. Hand pedals 24, 26 may be rotated synchronously to move forward or asynchronously to turn. Spring connectors 28, 30 provide resistance while simultaneously allowing for seamless movement that will mimic a four-legged animal in full stride and work the rider's midsection. The front assembly includes the front frame 20, differential gear box assembly 22, a derailleur 42, a speed cassette 40 (e.g. 11-speed cassette), hand pedals 24, 26, and spring connectors 28, 30 for front frame 20 and front wheel assembly 32. By turning hand pedals 24, 26 in a clockwise rotation, the rider transfers torque through a chain-link to a differential gear box, which in turn redistribute the power to the back wheels. Front assembly 14 will collapse and expand in response to the rotational push and pull of hand pedals 24, 26. This combined with the push and pull of the back pedals, will cause the rider midsection to contract and expand in response. A rider may typically rotate the hand pedals 24, 26 forward simultaneously to move forward. One pedal can be unlocked and rotated 180 degrees to allow for asymmetrical rotation. A gear shifting mechanism is located near or on the left-hand pedal.

Differential gear box assembly 22 includes a frame 38, a speed cassette 40, a derailleur 42, and a differential gear box 44. Differential gear box assembly 16 is used to help transfer torque from speed cassette 40 at the front of zero turn bicycle 10 to the rear wheels of zero turn bicycle 10. The gears will equal the back torque output the rear wheels create so there is no disparity in rotational speed. This may be calculated by calculating the number of teeth needed for two separate pinions to keep the front and torques equal. Frame 38 is attached to hollow tube 34 of front frame 20. Speed cassette 40 is attached to one end of frame 38, may be, e.g., an 11-speed cassette, and is used to shift between different speeds. Derailleur 42 is attached to frame 38 between speed cassette 40 and differential gear box 44. The derailleur is used to shift up and down gears on the 11-speed cassette. Spring connection for front frame—The front frame includes two metal tubes and these are held together by two spring attachments. When the rider is in a pull rotation of hand pedals 24, 26, the frame collapses and when the rider is in a push rotation of the front pedal, the frame will revert back to true position. The springs will add seamless movement, as well as resistance. Resistance will be strong enough to bounce the rider back upward, but not too strong where the frame will be able to collapse downward with the rider's forward thrusts. Speed cassette 40 and derailleur 42 are coupled by a chain. Differential gear box 44 is attached to the other end of frame 38 and is used to shift gears.

A gear shifting mechanism is attached to one of hand pedals 24, 26 and may be used to shift gears up and down based on the terrain. Differential gear box 44 is connected to a single sprocket and two gear shafts are attached to and rotate with the drive gear. A wire is attached to each gear shaft, two total, and is routed and connected to the differential gear boxes of the two independent wheels of rear assembly 16. The front and rear differential gear box assemblies will serve as the two connecting points for the torque/power output and create an even flow between the front and rear. The power output from the 11-speed cassette in the front will vary from that of the two independent rear wheels. To make the power output of the rear assembly dependent on the front assembly, the rear rotational track is connected to the rear wheels through only a single sprocket and the differential gear assembly will help transfer torque from hand pedals 24, 26 to the rear wheels. The transfer of torque is calculated by determining the number of teeth needed for the pinions in the front assembly gear box and rear assembly to evenly distribute varying speeds from front to rear. The 11-speed cassette's varying outputs of speed and torque are also accounted for in the calculation. If the rider adjusts the gear ratio, then the transfer of torque/power from hand pedals 24, 26 to the rear wheels will effectively complement and add to the forward propulsion of the vehicle. For example, similar to a bicycle on a downward slope, the rider will not add additional momentum by peddling unless the vehicle is shifted into a lower or a smaller diameter gear. The gear shifting mechanism will create symmetry between front forces and rear forces being exerted. The gears should equal the back torque output the rear wheels create so there is no disparity in rotational speed between the front and rear.

Front wheel assembly 32 is comprised of a front wheel 46, a fork 48, and a hollowed cylinder 50. Front wheel 46 is coupled to hollow tube 36 of front frame 20 by fork 48, which runs through hollowed cylinder 50 with a stopper on top. Hollowed cylinder 50 houses fork 48 and allows for 360-degree rotation of front wheel 46. This 360-degree rotation of front wheel 46 will enable the "zero turn" feature and allow for the turning radius to be accurate to the rider's intention without compensation. Front wheel 46 is connected to front wheel assembly 32 by fork 48 that can rotate 360 degrees. This 360-degree rotation will enable a "zero turn" feature and allow for the turning radius to be accurate to the rider's intention without compensation. Fork tube runs through cylinder 50 that is hollowed out and has a stopper on top. Cylinder 50 houses fork 48 and allows for the 360-degree rotation.

FIGS. 3A-D illustrate leg assembly 16. Leg assembly 16 is comprised of a pair of leg support systems 52, 54. Each leg support system 52, 54 is comprised of a rotational connector 56, 58, a quad support 60, 62, a knee support 64, 66, a shin support 68, 70, a rotational track 72, 74, and a foot holder 76, 78. Leg assembly 16 is the support system for the rider's legs and foot. Rider will extend their leg out close to 180 degrees and retract back to resting position, with knee bent to about 90 degrees. The quad supports 60, 62, knee supports 64, 66, and shin supports 68, 70 support the rider's leg. The rider's feet are supported by foot holders 76, 78, which are the main contributors to rear force. Leg support systems 52, 54 are the support system for rider's legs and foot. While using zero turn bicycle 10, the rider may extend their leg out close to 180 degrees and retract back to resting position, with knee bent to about 90 degrees. The quad supports 60, 62, knee supports 64, 66, and shin supports 68, 70 are all supports for the rider's respective legs, while the foot holders 76, 78 support each of the rider's feet, in addition to receiving the main rear contribution to force for moving zero turn bicycle 10. A pin is used to connect the foot holders 76, 78 to rotational track 72, 74. The pin is connected to a wheel that is in the center of the rotational track and moves with the foot holders 76, 78 both clockwise and counterclockwise around the track housing of rotational track 72, 74. This movement and rotational force to actuate the gears connected to the wheel. By independently operating the rear wheels, the rider may vary the torque between the two wheels causing the bike to turn in either direction in response to the variation in the torque. The front frame is comprised of two hollow tubes. These tubes are connected to the main chest frame and front wheel assembly. The hollow tubes are held together by two spring connections and have hand pedals 24, 26, differential gear box assembly, derailleur and 11-speed cassettes attached to them. The derailleur is used to shift up and down gears on the 11-speed cassette. The front frame includes two metal tubes and these are held together by two spring attachments. When the rider is in a pull rotation of the front pedals, the frame collapses and when the rider is in a push rotation of the front pedal, the frame will revert back to true position. The springs will add seamless movement, as well as resistance. Resistance will be strong enough to bounce the rider back upward, but not too strong where the frame will be able to collapse downward with the rider's forward thrusts.

Each rotational connector 56, 58 is coupled to bicycle frame 12 by a bearing and fork. The fork coupled to the bearing may rotate 360 degrees in a parallel motion to bicycle frame 12. Each quad support 60, 62 is coupled to the fork of rotational connector 56, 58 by an arm and pin, which allows for 360-degree rotation. Rotational connectors 56, 58 allow for back and forth movement of leg support systems 52, 54 parallel to bicycle frame 12.

Each quad support 60, 62 may have a thin padding to support and contour to the rider's quad for comfortability. Each knee support 64, 66 is coupled to a quad support 60, 62 by an arm. Knee supports 64, 66 may have a thin padding on one side to provide comfort for the rider's knee and wheels on the other side in case it comes into contact with the ground when the rider leans to one side. Each shin support 68, 70 is coupled to knee support 64, 66 by an arm. Shin supports 68, 70 may have padding for comfortability. Each shin support 68, 70 is coupled to a rotational track 72, 74 and a respective foot holder 76, 78. Leg support systems 52, 54 allow the rider's legs to straighten out to close to 180 degrees and then scrunch back towards the chest to close to 90 degrees. The rider's quadricep will rest on the quad supports 60, 62, which may include a thin padding that will add comfort and offer better support and contour to the quad for comfortability. Shin supports 68, 70 will be attached to a metallic arm that is connected to the rotational connector, which allows for movement of the leg parallel to the chest frame. Movement of the rider's legs will be identical to a squatting motion. The rider's knee may be on the knee support 64, 66, which support may have padding on it for comfortability. The knee may not always be in contact with knee support 64, 66. For instance, based on the extending of the leg the knee may hover just above knee support 64, 66 at various times. The assembly may, according to one embodiment, also include wheels because it may encounter the ground when the rider leans to one side. Knee supports 64, 66 are connected to respective quad supports 60, 62 and shin supports 68, 70 through arm links. Shin support 68, 70 will support the rider's shin and has padding on it for comfortability and extra support. Assembly includes attachment to the rotational track. Assembly is also attached to the foot holder. Movement is parallel to the frame and rider.

Rotational track 72, 74 allows leg assembly 16 to move and each is comprised of three single gears, a track belt, rotational ball with a rod connected to the foot holder, and housing. The foot holders 76, 78 are ergonomic for the rider and may be used as the primary push point to move the whole leg assembly 16. Shin supports 68, 70 are connected to foot holder to follow set path around rotational track. When one of the foot holders is being pushed and the other foot holder is not, the bike will turn in the opposite direction. For instance, if the right foot holder is being pushed with high force, and the left has little to no force being applied, the bike will turn left. The rotational track includes an oval shaped track surrounded by a housing that allows for the leg assembly to move. Assembly contains 3 single gears, track belt, rotational ball with a rod connected to the foot holder, and housing. Foot holder 76, 78 rotates around the track in a counterclockwise manner. The dimensions are calculated to allow for full extension of the leg assembly 16 and retraction of leg back into 90 degrees. Foot holder 76, 78 is also coupled to rotational track 72, 74 and follows a set path around it. A pin couples foot holders 76, 78 to rotational tracks 72, 74 and is also coupled to rear wheels 86, 88 of rear assembly 18. Leg support system 52, 54 moves similar to a squatting motion, wherein the legs will straighten to nearly 180 degrees and then scrunch back towards the chest so that the knee is bent at approximately 90 degrees.

FIGS. 4A-D illustrate rear assembly 18. Rear assembly 18 is comprised of rear frame 80, rotational connectors 82, 84, a pair of rear wheels 86, 88, and a rear damping assembly 90. Rear frame 80 is connected to bicycle frame 12 by rotational connectors 82, 84, which operate in the same fashion as rotational connectors 56, 58 of leg support system 52, 54. Rear frame 80 houses rear wheels 86, 88 and provides support to rear assembly 18. Having two rear wheels 86, 88 allows for a better center of gravity. Rear wheels 86, 88 are coupled to rear frame 80 through a bearing that can rotate 360 degrees. Rear frame 80 is coupled to a damping rod 92 to ensure rear wheels 86, 88 stay grounded while retaining free movement. The combination of rotational movement of the bearing coupled to rear wheels 86, 80 and rear damping assembly 90 allows rear wheels 86, 88 to contour to the road. Each rear wheel 86, 80 is operated independently, which allows the rider to vary the torque between the two wheels causing zero turn bicycle 10 to turn. According to one embodiment, rear assembly 18 may include 22-inch wheels. Each wheel of rear wheels 86, 88 is housed between rear frame 80 and is inside the leg assembly 16. The two wheels allows for a better center of gravity. Rear damping assembly 90 allows rear assembly 18 to have some movement and pivot in response to the rider changing direction or on a bumpier track similar to, e.g., a motor vehicle independent suspension. Rotational connectors 82, 84 includes a bearing that is connected to the bicycle frame 12. The fork that is connected to this bearing can rotate 360 degrees in a parallel motion to the bicycle frame 12. A pin is connected to the fork and screwed in. This pin goes through an arm that is connected to quad support 60, 62. This pin allows for rotation of quad support 60, 62 parallel to the bicycle frame 12. Both the fork connection and pin going through the arm attached to the fork have 360-degree rotation capability but will not necessarily rotate that much. This ability is allowed for the rider to move the whole leg support assembly back and forth parallel to the frame.

Rear damping assembly 90 is comprised of damping rod 92 from rear frame 80, two small rods 94, 96, and two springs 98, 100. Each small rod 94, 96 is coupled to damping rod 92. Each spring 98, 100 is coiled around a single small rod 94, 96 with a calculated tension to keep damping rod 92 connected to the bottom of rear damping assembly 90. Each rear wheel 86, 88 is coupled to a gear box that is coupled to front gear shaft of differential gear box 40 by a wire. Coupling of rear wheels 86, 88 gear boxes to front differential gear box 40 balances the front and rear forces for a smoother ride.

FIG. 5 illustrates stationary exercise vehicle/bicycle 200. Stationary bicycle 200 is similar in construction from the zero turn bicycle 10 described above but has several key differences from zero turn bicycle 10, which are described below, that allow the same movements while the bicycle remains in place. For example, stationary bicycle 200 does not have front assembly 14, rather it has a front stationary assembly 202. Furthermore, stationary bicycle 200 does not have rear assembly 18, rather it has a rear stationary assembly 204 and is supported by a stationary platform 206 connected to front stationary assembly 202 via a support frame 222.

Front stationary assembly 202 is comprised of a pair of support posts 232, 234, a front bar 226, a display screen 216, a screen support bar 240, and an extension system 214. Extension system 214 includes a sliding arm 218 having a first end 246 pivotally connected to a sliding member 244 and a second end 248 pivotally connected to a tubular frame 236. Sliding arm 218 is also affixed to a gear chamber 250 of extension system 214, where gear chamber 250 is coupled to a pair of hand pedals 210, 212. Extension system 214 also includes a sliding track 220 upon which sliding member 244 may slide, roll, or otherwise move. Sliding track 220 is coupled to a track frame 242, which is connected to front bar 226.

Extension system 214 allows stationary bicycle 200 to mimic the collapse and expansion of front assembly 14 (FIGS. 1A-C) of zero turn bicycle 10 (FIGS. 1A-C). Sliding arm 218 may be designed to partially collapse and expand as sliding member 244 moves along sliding track 220 in response to rotational push and pull of hand pedals 210, 212. Hand pedals 210, 212 may be rotated to mimic forward movement of zero turn bicycle 10 (FIGS. 1A-C). Similar to zero turn bicycle 10, turning hand pedals 210, 212 of stationary bicycle 200 in a clockwise motion propagates the torque via one or more gears within gear chamber 250 to redistribute power to rear stationary system 204. Additionally, gear chamber 250 may include a magnetic hand braking system will be positioned between hand pedals 210, 212 that has an adjustable resistive force that is capable of being adjusted by the rider to control the force needed to rotate hand pedals 210, 212. Sliding arm 218 provides resistance, as extension system 214 collapses and expands in response to the rotational push and pull of hand pedals 210, 212, while simultaneously allowing for seamless movement that will mimic usage of zero turn bicycle 10 (FIGS. 1A-C) and work the rider's midsection.

Rear stationary system 204 is comprised of magnetic braking system 208 and leg support systems 252, 254. Leg support systems 252, 254 include quad supports 260, 262, knee supports 264, 266, shin supports, 268, 270, rotational tracks 272, 274, and foot holders 256, 258. Similar to leg support system 52, 54 described above for zero turn bicycle 10, quad supports 260, 262 may, according to one embodiment, have a thin padding to support and contour to the rider's quad for comfortability. Each quad support 260, 262 is coupled to respective knee supports 264, 266 by an arm, and each knee support 264, 266 is coupled to respective shin supports 268, 270 by an arm. Shin supports 268, 270 may, according to one embodiment, have padding for comfortability. Each shin support 268, 270 is coupled to a respective rotational track 272, 274 and a respective foot holder 276, 278. Leg support systems 252, 254 may allow the rider's legs to straighten out to approximately 180 degrees and then scrunch back towards the chest to approximately 90 degrees. Quad supports 260, 262 may be capable of providing physical support to the rider's quads as the rider's legs move as the rider rotates foot holders 256, 258. For instance, each of the rider's legs may alternately perform a squatting motion as foot holders 256, 258 rotate. Foot holders 256, 258 may rotate about respective rotational tracks 272, 274, with positioning of rotational tracks 272, 274 being substantially parallel to the rider's frame. Knee supports 264, 266 may provide occasional support when the rider's knee comes into contact with knee supports 264, 266. Shin supports 268, 270 may provide be capable of providing support to the rider's shins.

Rotational tracks 272, 274 may allow leg support systems 252, 254 to move and each may include a plurality of gears, e.g. 3 single gears. Further, rotational tracks 272, 274 may include a track belt, rotational ball with a rod/pin connected to respective foot holders 256, 258, and a housing. Foot holders 256, 258 may be capable of being the primary push point to move leg support systems 252, 254 and follow set path around rotational tracks 272, 274. Shin supports 268, 270 are coupled to foot holders 256, 258 such that when a rider pushes foot holders 256, 258 then shin supports 268, 270, knee supports 264, 266, and quad supports 260, 262 also move such that the entire leg support systems 252, 254 may move back and forth parallel to the frame.

Magnetic braking system 208, is coupled to foot holders 256, 258 of leg support systems 252, 254. Magnetic braking system 208 allows for rider control over the force needed to push foot holders 256, 258 when power is redistributed to rear stationary system 204. Additionally, magnetic braking system 208 may be supported by track frame 242, which is connected to a rear bar 224 that is supported by another pair of support posts 228, 230 connected to support frame 222.

Stationary platform 206, is comprised of support frame 222, rear bar 224, front bar 226, four standing posts 228, 230, 232, 234, and track frame 242. Support frame 222 is a rectangular, planar frame and at each corner is positioned one of the standing posts 228, 230, 232, 234. Two standing posts 228, 230 at one of the shorter ends support frame 222 support rear bar 224 and the other two standing posts 232, 234 at the other shorter end of support frame 222 support front bar 226. Rear bar 224 is coupled to track frame 242, which provides structural support for both magnetic braking system 208 and extension system 202. Each standing post 228, 230, 232, 234 is coupled to a spring to control lateral movement.

Additionally, stationary bicycle 200 includes chest rest 238, which is attached to tubular frame 236 above the attachment point of second end 248 and positioned between stationary front assembly 202 and magnetic braking system 208.

To operate zero turn bicycle 10 (FIGS. 1A-C), a rider will first straddle rear frame 80, placing left leg between leg support system 52 and rear frame 80 and right leg between leg support system 54 and rear frame 80. Rider will lean forward in a prone position with their chest contacting chest rest 11. Rider will place each hand on hand pedals 24, 26 for support. Then, rider will contact each section of leg support systems 52, 54 with appropriate body part and place feet in foot holders 76, 78. Rotating hand pedals 24, 26 and foot holders 76, 78 synchronously will move the rider forward. Rotating asynchronously will cause zero turn bicycle 10 to turn. For example, halting rotation of hand pedal 24 and foot holder 76 while continuing to rotate hand pedal 26 and foot pedal 78 will cause zero turn bicycle to turn left. To turn right, half rotation of hand pedal 26 and foot pedal 78 while continuing to rotate hand pedal 24 and foot holder 76.

To operate stationary bicycle 200 (FIG. 5), rider will assume the same position as for zero turn bicycle 10 (FIGS. 1A-1C). Rotating hand pedals 210, 212 and foot holders 256, 258 will cause stationary bike 200 to mimic the expanding and collapsing movement of zero turn bicycle 10 and work the rider's midsection. However, stationary bicycle 200 does not turn if hand pedals 210, 212 and foot holders 256, 258 are rotated asynchronously.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprise" (and any form of comprise, such as "comprises" and "comprising"), "have" (and any form of have, such as "has", and "having"), "include" (and any form of include, such as "includes" and "including"), and "contain" (and any form of contain, such as "contains" and "containing") are open-ended linking verbs. As a result, a method or device that "comprises," "has," "includes," or "contains" one or more steps or elements possesses those one or more steps or elements but is not limited to possessing only those one or more steps or elements. Likewise, a step of a method or an element of a device that "comprises," "has," "includes," or "contains" one or more features possesses those one or more features but is not limited to possessing only those one or more features. Furthermore, a device or structure that is configured in a certain way is configured in at least that way but may also be configured in ways that are not listed.

The invention has been described with reference to the preferred embodiments. It will be understood that the architectural and operational embodiments described herein are exemplary of a plurality of possible arrangements to provide the same general features, characteristics, and general system operation. Modifications and alterations will occur to others upon a reading and understanding of the preceding detailed description. It is intended that the invention be construed as including all such modifications and alterations.

Having just described the preferred embodiments, the invention is now claimed to be:

1. A vehicle propellable by a human comprising:
   a front assembly having a front wheel and a pair of hand pedals connect thereto;
   a rear assembly having a first rear wheel and a second rear wheel rotatably connected thereto;

a chest rest located between the front assembly and the rear assembly, the chest rest configured to support the chest of a rider lying forward on the vehicle; and a first foot support operatively coupled to rotate the first rear wheel, and a second foot support operatively coupled to rotate the second rear wheel wherein the first rear wheel and second rear wheel are independently rotated by opposite feet of a rider when said feet are within said first and second foot support, respectively.

2. The vehicle of claim 1 wherein the front assembly, rear assembly and chest rest are connected to form a frame of said vehicle wherein the rider grips said pair of hand pedals with hands and legs forward on said frame with the feet within said foot supports.

3. The vehicle of claim 2 wherein said frame flexes downward and forward when said rider rotates a hand pedal forward and/or one or more of said foot supports is pushed rearward by one or more of said feet.

4. The vehicle of claim 1, wherein said front assembly includes multiple sections connected by a spring assembly to allow said front assembly to flex.

5. The vehicle of claim 1, wherein said rear assembly is rotatable relative to said front assembly to allow said frame to flex.

6. The vehicle of claim 1, comprising a differential gear assembly operatively connected to the pair of hand pedals, the differential gear assembly being coupled operatively to said first rear wheel and second rear wheel to rotate the same.

7. The vehicle of claim 1, wherein the hand pedals are operatively connected to a multi speed cassette gear and derailleur to move a sprocket chain between sets of sprockets on said cassette to change speed of rotation of said hand pedals.

8. The vehicle of claim 7, wherein a hand shifter proximate said hand pedals is connected to the derailleur to facilitate shifting of gears.

9. The vehicle of claim 1, wherein said first foot support is operatively connected to said first rear wheel by a rotational track, the rotational track having an oval shaped track operationally engaged to the first foot support to move said foot support around said track as said rider's foot pushes and pulls said foot support to rotate said first rear wheel.

10. The vehicle of claim 1, wherein said second foot support is operatively connected to said second rear wheel by a rotational track, the rotational track having an oval shaped track operationally engaged to the second foot support to move said foot support around said track as said rider's foot pushes and pulls said foot support to rotate said second rear wheel.

11. A stationary vehicle system, the stationary vehicle system being operated by a human rider, the stationary vehicle system comprising:

a stationary platform comprising a track frame;

a front assembly operatively coupled to the stationary platform, the front assembly comprising an extension system, the extension system comprising a sliding track coupled to the track frame, the sliding track being capable of directing movement of a sliding member, the sliding member being operatively coupled to at least one hand pedal;

a rear stationary assembly coupled to the stationary platform, the rear stationary assembly comprising:

a first foot support operatively coupled to slide a first rear pedal in a first track, and a second foot support operatively coupled to slide a second rear pedal in a second track wherein the first rear pedal and second rear pedal are independently slidable by opposite feet of a rider when said feet are within said first and second foot supports, respectively;

a braking system coupled to the first rear pedal and the second rear pedal; and a chest rest located between the front assembly and the rear stationary assembly, the chest rest being capable of providing chest support to the human rider operating the stationary vehicle system.

12. The stationary vehicle system of claim 11, wherein said sliding member of said extension system is capable of moving along said sliding track when said human rider rotates a hand pedal of said at least one hand pedal and/or at least one of said first rear pedal and second rear pedal.

13. The stationary vehicle system of claim 11, wherein said front assembly comprises a sliding arm, the sliding arm capable of at least partially collapsing and expanding as said sliding member moves along said sliding track in response to rotational push and pull of said at least one hand pedal by said human rider.

14. The stationary vehicle system of claim 11, wherein rotation of said at least one hand pedal by said human rider is capable of propagating torque via at least one gear to redistribute power to said rear stationary assembly.

15. The stationary vehicle system of claim 11, wherein said extension system comprises a gear chamber, the gear chamber comprising a magnetic hand braking system, wherein an amount of resistive force, applied by the magnetic hand braking system when said human rider rotates said at least one hand pedal, is capable of being adjusted.

16. The stationary vehicle system of claim 11, wherein said rear stationary assembly further comprises at least one quad support.

17. The stationary vehicle of claim 11, wherein said rear stationary assembly further comprises at least one shin support.

18. The stationary vehicle of claim 11, wherein said rear stationary assembly further comprises at least one knee support.

* * * * *

UNITED STATES PATENT AND TRADEMARK OFFICE
CERTIFICATE OF CORRECTION

| | |
|---|---|
| PATENT NO. | : 11,447,206 B2 |
| APPLICATION NO. | : 16/930891 |
| DATED | : September 20, 2022 |
| INVENTOR(S) | : Weitz et al. |

It is certified that error appears in the above-identified patent and that said Letters Patent is hereby corrected as shown below:

In the Claims

Column 10, Line 65: Claim 1, Delete "connect" and insert -- connected --

Signed and Sealed this
Fifteenth Day of November, 2022

Katherine Kelly Vidal
*Director of the United States Patent and Trademark Office*